(12) United States Patent
Woerdemann

(10) Patent No.: US 8,040,439 B2
(45) Date of Patent: Oct. 18, 2011

(54) METHOD FOR STATION SORTING AND STORAGE IN A TELEVISION OR RADIO SET

(75) Inventor: Hermes Woerdemann, Hameln (DE)

(73) Assignee: Thomson Licensing, Boulougne-Billancourt (FR)

( * ) Notice: Subject to any disclaimer, the term of this patent is extended or adjusted under 35 U.S.C. 154(b) by 1216 days.

(21) Appl. No.: 11/665,865

(22) PCT Filed: Oct. 6, 2005

(86) PCT No.: PCT/EP2005/055044
§ 371 (c)(1),
(2), (4) Date: Apr. 19, 2007

(87) PCT Pub. No.: WO2006/045688
PCT Pub. Date: May 4, 2006

(65) Prior Publication Data
US 2009/0059089 A1    Mar. 5, 2009

(30) Foreign Application Priority Data
Oct. 20, 2004    (DE) .......................... 10 2004 051 238

(51) Int. Cl.
*H04N 5/50*    (2006.01)
(52) U.S. Cl. ........................................................ 348/732
(58) Field of Classification Search .................. 348/732, 348/731, 725, 735, 569, 570, 563–565; 725/27–28, 725/38, 47, 56, 57
See application file for complete search history.

(56) References Cited

U.S. PATENT DOCUMENTS

| | | | | |
|---|---|---|---|---|
| 4,763,195 A * | 8/1988 | Tults | ............................. | 348/732 |
| 5,512,955 A | 4/1996 | Toyoshima et al. | | |
| 5,625,422 A * | 4/1997 | Kim | ............................... | 725/57 |
| 6,817,027 B1 * | 11/2004 | Curreri | ............................ | 725/28 |
| 7,221,412 B2 * | 5/2007 | Shibusawa | ..................... | 348/732 |
| 7,242,438 B2 * | 7/2007 | Song | ............................ | 348/569 |
| 2002/0069409 A1 * | 6/2002 | Storz | ............................... | 725/37 |

FOREIGN PATENT DOCUMENTS

| | | |
|---|---|---|
| EP | 0561189 | 9/1993 |
| EP | 0660603 | 6/1995 |
| JP | 6141250 | 5/1994 |
| JP | 2003133913 | 5/2003 |
| WO | WO 2004/082302 | 9/2004 |

OTHER PUBLICATIONS

Search Report Dated January 18, 2006.

* cited by examiner

*Primary Examiner* — Paulos Natnael
(74) *Attorney, Agent, or Firm* — Robert D. Shedd; Jeffrey M. Navon

(57) ABSTRACT

In a method for sorting and storing stations in a television or radio broadcasting set, the received stations are firstly represented in an arbitrary order in a matrixlike list or table on a display device. An input field into which a user inputs a program location number is represented for each station. The input may be effected by directly inputting one or more numerals, or be selecting a number from a list of available program location numbers. Selection fields whose selection brings about a deletion of the respective station or a shift to the end of the list may additionally be represented. Once the input or selection fields have been filled in or selected, the stations are sorted in accordance with the inputs. The sorted list is then stored.

10 Claims, 2 Drawing Sheets

| Station | Memory | Delete | Move to End |
|---|---|---|---|
| ARD | 1 | ☐ | ☐ |
| N3 | 3 | ☐ | ☐ |
| RTL | 4 | ☐ | ☐ |
| SAT | 5 | ☐ | ☐ |
| XXX |   | ☑ | ☐ |
| YYY |   | ☐ | ☑ |
| ZDF | 2 | ☐ | ☐ |
|   |   |   | Enter |

| Station | Memory | Delete | Move to End |
|---|---|---|---|
| ARD | 1 | ☐ | ☐ |
| N3 | 3 | ☐ | ☐ |
| RTL | 4 | ☐ | ☐ |
| SAT | 5 | ☐ | ☐ |
| XXX |  | ☑ | ☐ |
| YYY |  | ☐ | ☑ |
| ZDF | 2 | ☐ | ☐ |
|  |  | Enter | |

Fig. 1

| Station | Memory | Delete | Move to End |
|---|---|---|---|
| ARD | 1 | ☐ | ☐ |
| ZDF | 2 | ☐ | ☐ |
| N3 | 3 | ☐ | ☐ |
| RTL | 4 | ☐ | ☐ |
| SAT | 5 | ☐ | ☐ |
| XXX |  | ☑ | ☐ |
| YYY |  | ☐ | ☑ |
|  |  | Enter | |

Fig. 2

| Station | Memory | Delete | Move to End |
|---------|--------|--------|-------------|
| ARD | 1 | | |
| ZDF | 2 | | |
| N3 | 3 | | |
| RTL | 4 | | |
| SAT | 5 | | |
| YYY | 6 | | |
| | | Enter | |

Fig. 3

| 1. | ARD | 1 | 2 | 3 | 4 | 5 | 6 | 7 |
|----|-----|---|---|---|---|---|---|---|
| 2. | N3  | 2 | 3 | 4 | 5 | 6 | 7 |   |
| 3. | RTL | 2 | 4 | 5 | 6 | 7 |   |   |
| 4. | SAT | 2 | 5 | 6 | 7 |   |   |   |
| 5. | XXX | 2 | 6 | 7 |   |   |   |   |
| 6. | YYY | 2 | 6 |   |   |   |   |   |
| 7. | ZDF | 2 | 6 |   |   |   |   |   |

Fig. 4

METHOD FOR STATION SORTING AND STORAGE IN A TELEVISION OR RADIO SET

This application claims the benefit, under 35 U.S.C. §365 of International Application PCT/EP2005/055044, filed Oct. 6, 2005, which was published in accordance with PCT Article 21(2) on May 4, 2006 in English and which claims the benefit of German patent application No. 102004051238.8, filed Oct. 20, 2004.

Present-day television and radio broadcast receivers are suitable for receiving a multiplicity of stations. The multiplicity of stations is stored in a memory in the receivers and can be called up again by the user for example by means of a station memory number or program location number assigned to the respective station. The terms station memory number and program location number are used synonymously hereinafter.

For storage for the first time or else when stations are added later, it is known to carry out an automatic station search and to store the stations found in the order in which they are found. In this case, station memory numbers or program location numbers are allocated to the stations in ascending order. However, the stations found are not necessarily present in an order desired by the user.

It is known, moreover, for the list of stations found during the search to be sorted after the search has been effected, for example according to a predetermined list or, if the stations can be identified by means of an alphanumeric designator, alphabetically. The alphanumeric designator is, for example, a station abbreviation transmitted with the station's program, or the like. The term program in this description denotes the transmitted broadcasts. It is likewise known for a station identification to be transmitted by means of the VPS signal, or for it to be extracted from the teletext signal. In digital transmission methods, a station identification may also be effected by means of corresponding data in a so-called "header" of the program data stream, which, in the case where the data are transmitted in packets, enables the data packets to be assigned to a program or station.

It is likewise known for the station order generated by means of the abovementioned methods to be changed manually after automatic sorting has been effected. The manual sorting is effected by selection of a station and allocation of a new program location number or station memory number to the selected station. In this case, known methods correspond to the so-called "bubble sort principle", a desired sorting order finally being achieved by progressively interchanging two elements in each case.

The known methods are relatively time-consuming and susceptible to errors, since two stations are interchanged with one another manually in each case. When there are a large number of stations, even an experienced user may easily lose track.

It is desirable, therefore, to obtain an improved method for selecting and sorting stations in television and radio broadcasting receivers.

The method specified in patent claim 1 provides for the multiplicity of stations received during a station search, for example, to be displayed in a matrix-type list or table on a display device. Items of information by means of which the stations can be identified are represented in a first column. Input fields which are individually assigned to each station and in which the user inputs a desired program location number or station memory number are represented in a second column.

Since it can happen that not all the available stations or programs can be represented simultaneously on a screen of the television or radio broadcasting set, one further development of the invention provides for the program location number or station memory number that is respectively input by the user to be compared with the numbers already allocated. If a match with a number that has already been allocated is ascertained, the input is not accepted and/or it is pointed out to the user that the number has already been allocated. For this purpose, by way of example, the field with the erroneous input is highlighted by means of a different background colour, or represented in inverted fashion or in flashing fashion.

One embodiment of the invention involves representing the stations with in each case identical allocated program location numbers or station memory numbers in a list or table in adjacent positions.

In one further development of the invention, the station that has just been allocated a number that had already been allocated previously acquires the already allocated station memory number or program location number. The station that had previously been allocated the same program location number acquires a program location one number higher. In the same way, the remaining stations having higher program location numbers or station memory numbers than the one currently allocated acquire a program location one number higher than before. That is to say that the stations with a program location number or station memory number that is higher than the currently allocated number are shifted back one place, that is to say towards higher numbers.

In another further development of the method, a third column is represented, which contains input or selection fields into which the user inputs that the respective station is to be shifted to the end of the list. The station memory number or program location number that is then actually allocated is insignificant in this case. This function is beneficial, for example, if the user, when allocating the station memory numbers or program location numbers, ascertains that the station has been found a number of times or that the station is of no interest to the user.

In another further development of the method, a fourth column is represented, in which are represented selection or input fields which are individually assigned to each station and by means of which the user can select one or more stations for deletion.

The selection of shifting a station to the end of the list or for deletion is preferably effected by corresponding selection of a selection field, which is also known as a "check box", for example by marking the latter with a symbol showing a stylized cross or a tick.

In one embodiment of the invention, the current program or a still frame—generated from the current program—of the station respectively selected for processing is represented as a background picture or as a size-reduced picture in a region of the screen. This enables the user to identify stations that do not transmit a designator, or to select stations with an encrypted program for deletion. Furthermore, this makes it possible for a program of the same station which is transmitted on different frequencies and has been found a number of times during the station search to be selected according to the signal quality and for a program location number or station memory number to be allocated correspondingly.

In another embodiment of the invention, an automatic pre-sorting is performed, for example in alphabetical order.

The user can initiate a sorting step after the desired station memory numbers or program location numbers have been input. A corresponding command is provided for execution, for example a key on the remote control, or a selection field on the screen. Repeated execution of the sorting makes it possible for the desired order of the stations to be attained step by step, which may be advantageous particularly in the case of station lists having very many entries.

The method is ended with a command for storing the inputs. As an alternative, the calling-up of the storage function may also automatically bring about a prior sorting in accordance with the inputs effected up to that point. Aborting the execution of the method does not bring about storage. All inputs effected up to that point are discarded.

If, for one or more stations, the second column of the table in each case does not contain an entry of a program location number, and none of the fields in the respective third or fourth column has been selected either, the corresponding stations are automatically shifted to the end of the list when the method is ended. No specific sorting is then effected for these stations.

If one of the selection fields in the third or fourth column has been selected, it is not necessary to input a program location number or station memory number. Moreover, in one embodiment of the invention, it is provided that the selection fields of the third or fourth column can be selected only alternatively. The selection of one of the fields of the third or fourth column, in one embodiment of the method according to the invention, automatically brings about the deselection of a possibly previously effected selection of the selection field in the respective other column. Furthermore, any memory location number entered prior to selecting one of the selection fields is deleted and may be assigned to other stations. In yet another embodiment of the invention, the user has to cancel the selection in one column before he can select the selection field in the respective other column.

The program location numbers are input in a known manner by means of a remote control with numeric keys, or by means of a selection menu controlled by means of cursor keys or the like. Depending on the equipment of the television or radio broadcasting receiver, an input on the apparatus is also possible.

In one embodiment of the invention, when a station is selected, a list comprising station memory numbers or program location numbers that are still available appears. The station memory numbers or program location numbers that have already been selected are not represented. The highest number represented expediently corresponds to the number of programs found during the station search, reduced by the number of stations that have already been previously noted for deletion.

The method can advantageously be carried out in a TV receiver or a radio receiver with a microprocessor and a memory, wherein the microprocessor is adapted to perform the method steps, e.g. as a software routine.

The invention will be explained in more detail below with reference to the drawing, in which:

FIG. 1 shows an exemplary unsorted station list;

FIG. 2 shows an exemplary sorted station list prior to storage;

FIG. 3 shows an exemplary sorted station list after storage; and

FIG. 4 shows examples of a list of the available program location numbers after a program has been selected.

FIG. 1 shows an exemplary table with stations in an arbitrary order, such as is present after a station search. In the column "Memory", a user has allocated memory location numbers or program location numbers to the stations, which can be identified by means of combinations of letters and numbers reproduced in the column "Station". The user has selected the station with the designator "XXX" for deletion by selecting the selection field "Delete". The user has selected the station with the designator "YYY" for shifting to the end of the list by selecting the selection field "Move to end". A selection field "Enter" is represented in the bottommost row, this selection field bringing about the sorting on the basis of the inputs. Navigation within the table is effected for example by means of corresponding cursor or arrow keys on the apparatus or on a remote control.

FIG. 2 shows an exemplary table with stations in a sorted order. The sorting was effected in accordance with the inputs in the table from FIG. 1. The station with the designator "XXX" to be deleted and the station with the designator "YYY" to be shifted to the end of the list have firstly been shifted to the end of the table, with their original order not having been changed.

FIG. 3 shows an exemplary table with stations in a sorted order after storage has been effected. The station with the designator "XXX" to be deleted from the table in FIG. 2 is no longer present. The station with the designator "YYY" to be shifted to the end of the list occupies the last place in the list and acquired the next free program location, in this case 6.

FIG. 4 illustrates a table with examples of a selection list of the available program location numbers. The order of the stations corresponds to that of the table illustrated in FIG. 1. A first step involves selecting the station with the designator "ARD". It is the first station which is selected. Therefore, a total of seven program locations are available, corresponding to the total number of stations in the list. All of the available program locations are accordingly displayed. In the second step, the user has called up the station with the designator "N3". Since the program location 1 has already been allocated to the station with the designator "ARD", only the program locations 2 to 7 are still available. In this example, the user chooses the program location with the number 3. In the third step, the user has called up the station with the designator "RTL". Only the program locations 2 and also 4 to 7 are still available. In this example, the user chooses the program location with the number 4. In the fourth step, the user has called up the station with the designator "SAT". Only the program locations 2 and also 5 to 7 are still available. In this example, the user chooses the program location with the number 5. In the fifth step, the user has called up the station with the designator "XXX". Only the program locations 2 and also 6 to 7 are still available. In this example, the user decides to delete the station from the list and does not select a program location number. In the sixth step, the user has called up the station with the designator "YYY". Only the program locations 2 and 6 are still available since deleting the station with the designator "XXX" has reduced the total number of available stations by one. The user decides to shift the station to the end of the list and not to select a program location number. In the 7th step, the user has called up the station with the designator "ZDF". The program locations 2 and 6 are still available because the user did not prescribe a program location number in the preceding step. In this example, the user chooses the program location with the number 2. The result of the inputs after sorting and storage have been effected is illustrated in the table in FIG. 3.

The invention claimed is:

1. A method of processing a list of received radio or television stations in a radio broadcasting or television set, each radio or television station being allocated a unique memory location number by means of which a user can call up the station, wherein the memory location number can be assigned to a station by a user, wherein the method includes the step of:

providing an unprocessed list of received stations in a first order not desired by a user on a display;

providing a first input field individually assigned to each radio or television station, into which input field the user inputs a program location number;

providing on the display a list of available memory location numbers that can be assigned to a station; and storing the radio or television stations and the respective user-assigned program location numbers in response to a user command such that the radio or television stations can be called up in a second order sorted in accordance with the user's previous input.

2. The method of claim 1, further including the steps of:

providing on the display a further input field individually assigned to each station, the selection of which brings about the marking of a station for deletion; and/or providing on the display a further input field individually assigned to each station, the selection of which brings about the marking of a station for shifting to the end of the list.

3. The method of claim 1, wherein the memory location number is input by inputting one or more corresponding numerals.

4. The method of claim 1, wherein the program location number is input by selecting a corresponding number from the provided list of available memory location numbers.

5. The method of claim 1, wherein the highest number in the list of available memory location numbers corresponds to the number of received stations, reduced by the number of stations marked for deletion.

6. The method of claim 1, wherein the list of available numbers contains only those numbers which have not yet been selected by previous inputs.

7. The method of claim 1, wherein the current program of the currently selected station is reproduced as background picture or size reduced picture in a region of the display device.

8. The method of claim 1, wherein the stations can be identified by means of an alphanumeric designator.

9. The method of claim 8, wherein the method steps are preceded by an automatic alphabetic sorting.

10. A television or radio broadcasting set with a microprocessor and a memory, wherein the microprocessor is adapted to carry out the method according to claim 1.

* * * * *